(12) United States Patent
Takeshima et al.

(10) Patent No.: US 8,036,495 B2
(45) Date of Patent: Oct. 11, 2011

(54) RESOLUTION CONVERSION APPARATUS, METHOD, AND PROGRAM

(75) Inventors: Hidenori Takeshima, Ebina (JP); Toshimitsu Kaneko, Kawasaki (JP); Takashi Ida, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 386 days.

(21) Appl. No.: 12/408,918

(22) Filed: Mar. 23, 2009

(65) Prior Publication Data

US 2010/0020241 A1   Jan. 28, 2010

(30) Foreign Application Priority Data

Jul. 25, 2008   (JP) .................. 2008-192533

(51) Int. Cl.
*G06K 9/32* (2006.01)
*H04N 5/00* (2011.01)

(52) U.S. Cl. ........................ 382/299; 348/607

(58) Field of Classification Search .......... 382/148, 382/299, 300; 348/24, 33, 333.11, 208.13, 348/441, 445, 455, 458, 459, 607; 379/88.14, 379/339, 353; 708/204, 206, 442, 809
See application file for complete search history.

(56) References Cited

U.S. PATENT DOCUMENTS

| | | | | |
|---|---|---|---|---|
| 7,116,842 | B2 * | 10/2006 | Daigi | 382/300 |
| 7,142,689 | B2 * | 11/2006 | Hayashi et al. | 382/100 |
| 2007/0269137 | A1 | 11/2007 | Ida et al. | |
| 2008/0107356 | A1 | 5/2008 | Matsumoto et al. | |
| 2009/0074328 | A1 | 3/2009 | Matsumoto et al. | |

OTHER PUBLICATIONS

Hidenori Takeshima, et al., "Image Registration Using Shifted Images for Super Resolution", Meeting on Image Recognition and Understanding, Jul. 2008, pp. 484-489.
Sung Cheol Park, et al., "Super-Resolution Image Reconstruction: A Technical Overview", IEEE Signal Processing Magazine, May 2003, pp. 21-36.
Masao Shimizu, et al., "Precise Sub-Pixel Estimation on Area-Based Matching", IEEE International Conference on Computer Vision 2001, pp. 90-97.
Chris Harris, et al., "A Combined Corner and Edge Detector", Alvey Vision Conference, 1988, pp. 147-151.
Masao Shimizu, et al., "Two-Dimensional Simultaneous Sub-Pixel Estimation for Area-Based Matching", The IEICE Transactions D-II, vol. J87-D-II, No. 2, 2004, pp. 554-564.

* cited by examiner

*Primary Examiner* — Abolfazl Tabatabai
(74) *Attorney, Agent, or Firm* — Oblon, Spivak, McClelland, Maier & Neustadt, L.L.P.

(57) ABSTRACT

An apparatus includes a first-acquisition unit acquiring, from target image data, an input image pattern including pixel values within a predetermined range with reference to each of ideal corresponding points, a second-acquisition unit acquiring, as candidate image patterns, from search-image-pattern data, a first candidate image pattern including pixel values within the predetermined range, a finding unit finding, from the search-image-pattern data, an estimated image pattern as a second candidate image pattern of the candidate image patterns which has a smaller difference from the input image pattern than other candidate image patterns, a first setting unit setting pixel values of positions corresponding to the ideal corresponding points in the estimated image pattern as pixel values at the ideal corresponding points, and a conversion unit converting a resolution of the target-image data using the N-dimensional coordinate values and the pixel values corresponding to the N-dimensional coordinate values.

8 Claims, 10 Drawing Sheets

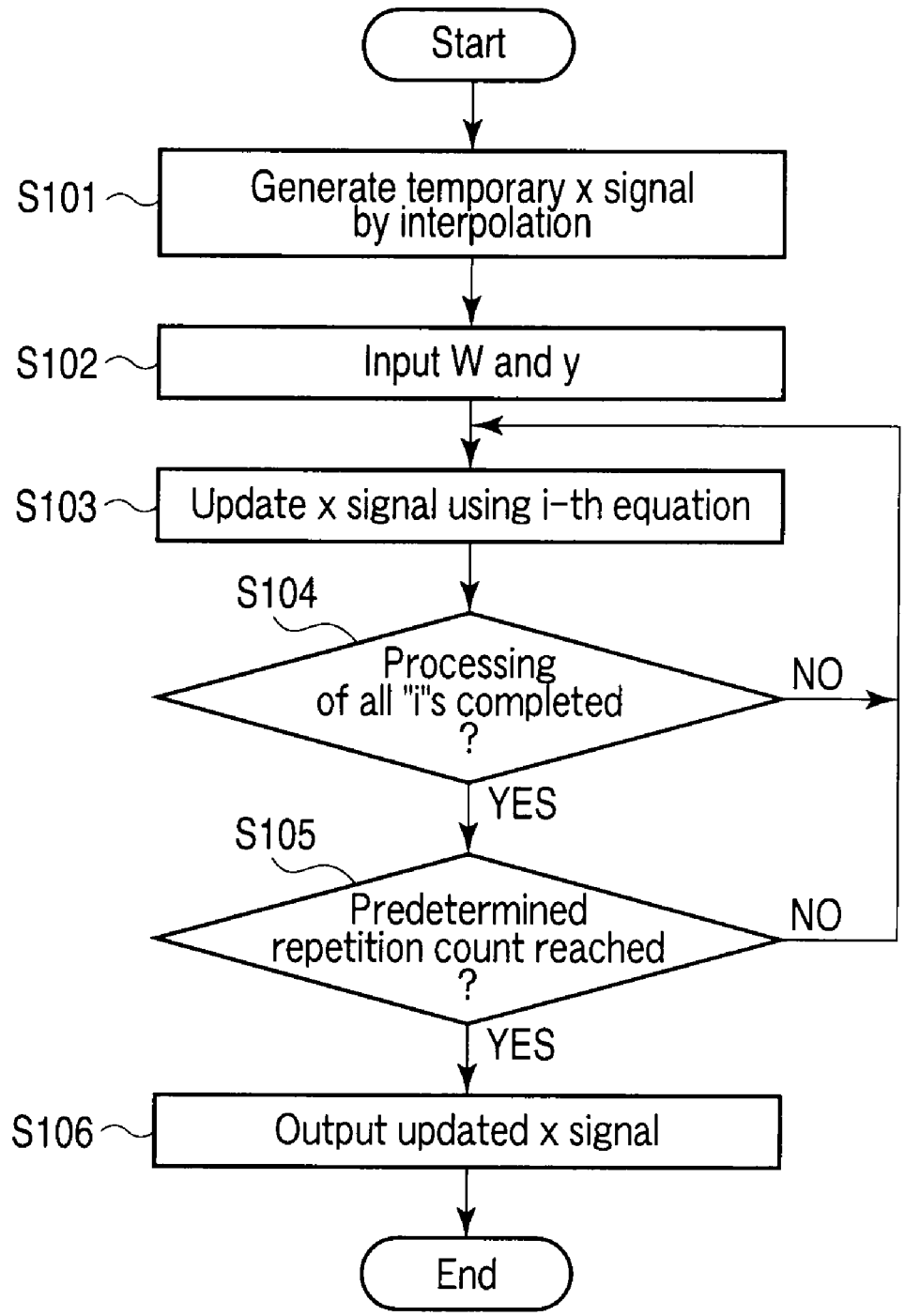
F I G. 1

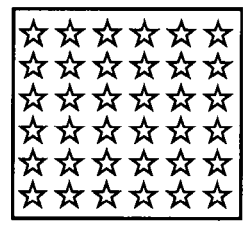
Conversion target frame
☆ : Ideal corresponding point
F I G. 3
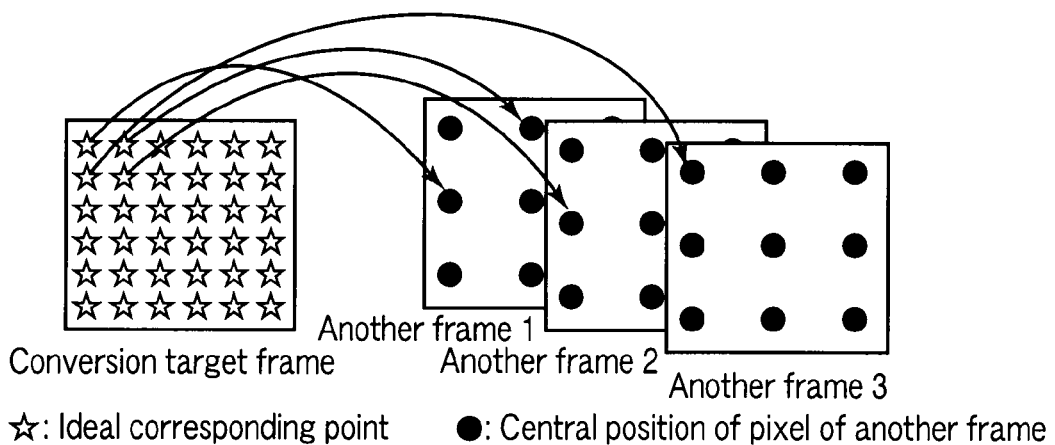
Conversion target frame   Another frame 1
                          Another frame 2
                                          Another frame 3
☆: Ideal corresponding point   ●: Central position of pixel of another frame
F I G. 4
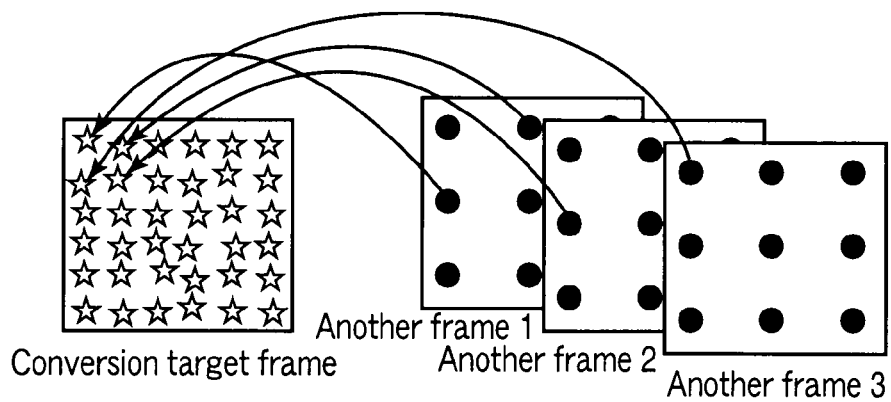
Conversion target frame   Another frame 1
                          Another frame 2
                                          Another frame 3
F I G. 5

F I G. 12
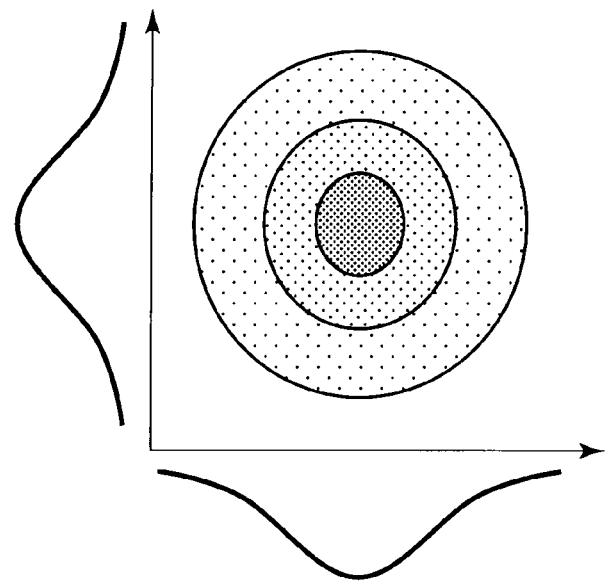
F I G. 13
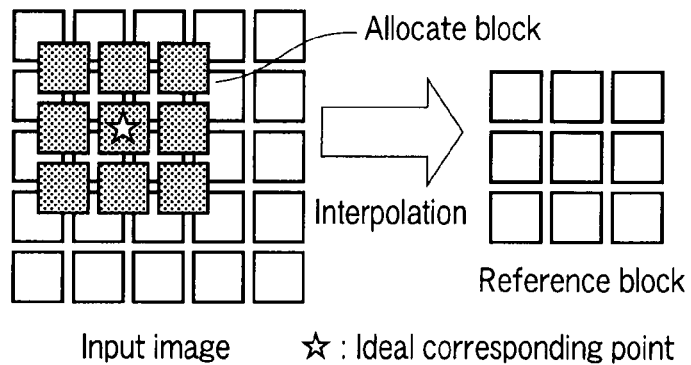
F I G. 14
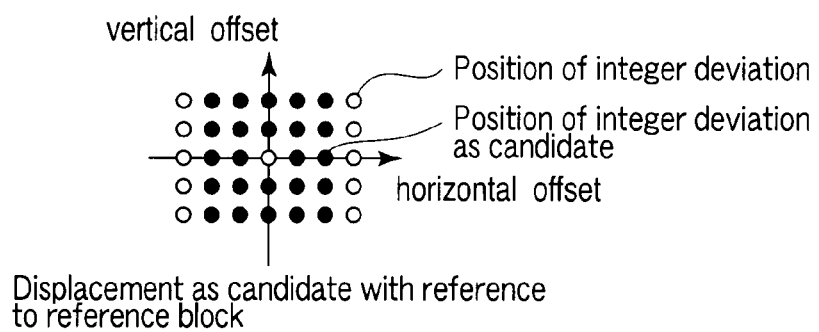

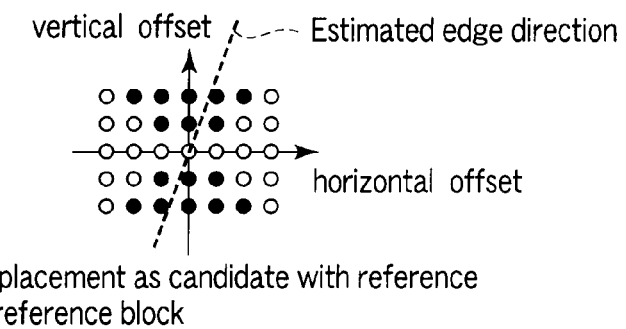
F I G. 15
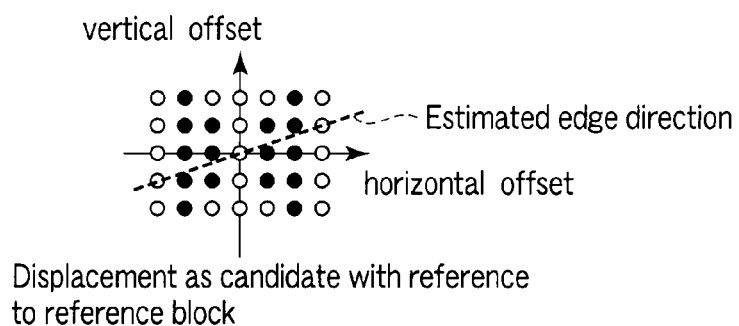
F I G. 16
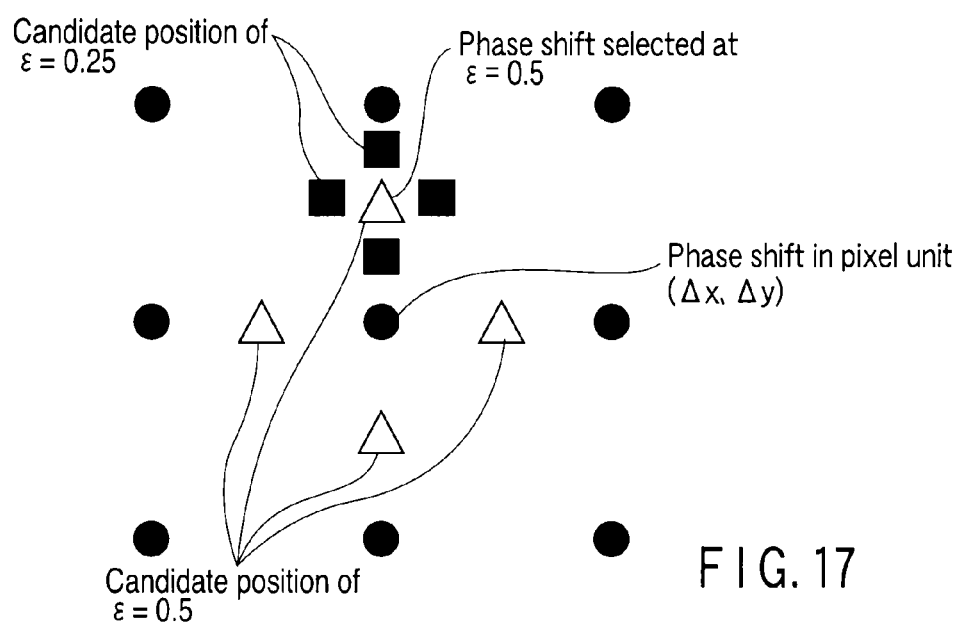
F I G. 17

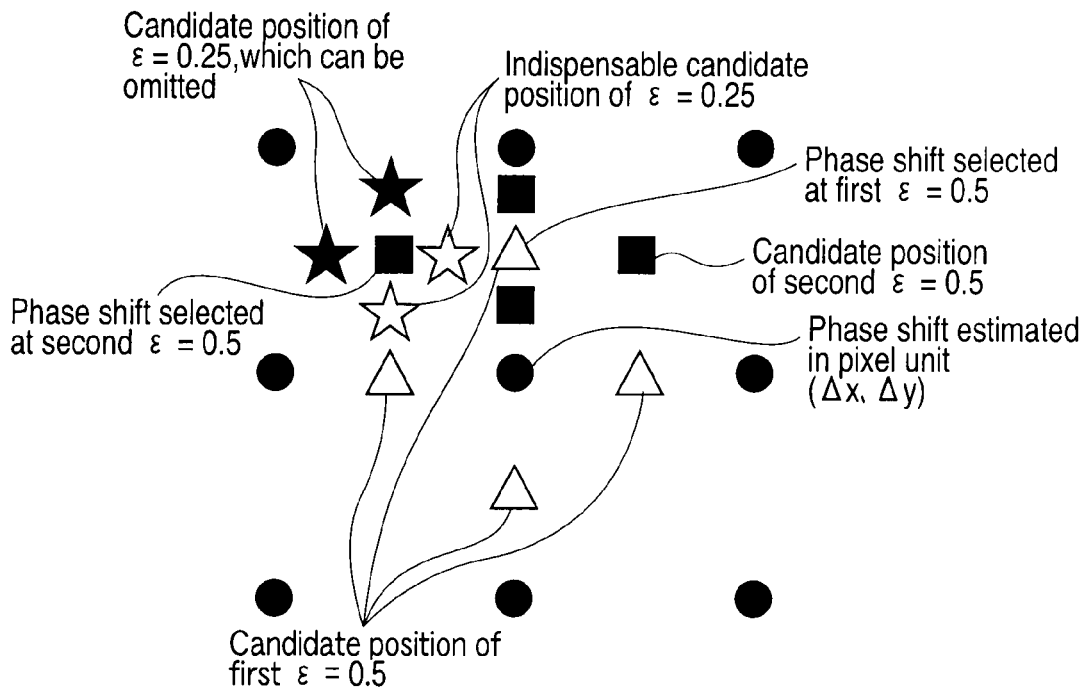
F I G. 18
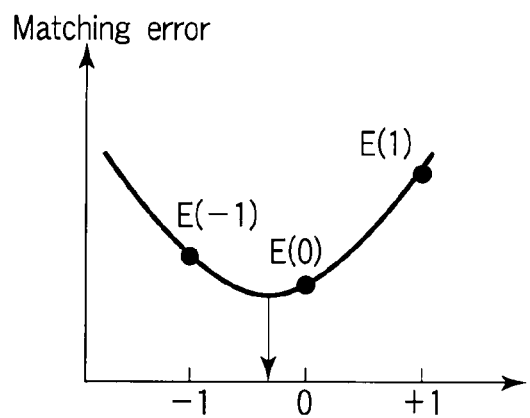
F I G. 19

RESOLUTION CONVERSION APPARATUS, METHOD, AND PROGRAM

CROSS-REFERENCE TO RELATED APPLICATIONS

This application is based upon and claims the benefit of priority from prior Japanese Patent Application No. 2008-192533, filed Jul. 25, 2008, the entire contents of which are incorporated herein by reference.

BACKGROUND OF THE INVENTION

1. Field of the Invention

The present invention relates to a resolution conversion apparatus, method, and program, which convert an image into an image of another sampling rate.

2. Description of the Related Art

Televisions and displays with high resolutions are now commonly available. Upon displaying an image, a television or display converts the number of pixels of image data into that of a panel. Especially, in upscaling, which increases the number of pixels, as a method of obtaining a sharper image than linear interpolation, a method of reconstructing a high-resolution image using information of a plurality of frames in consideration of an inverse problem of an image sensing process (deterioration process) (to be referred to as a reconstruction method hereinafter) is known.

More specifically, for example, a block defined by a square of several pixels (for example, a block of 5 pixels (horizontal)×5 pixels (vertical)) is extracted from a low-resolution image to have a certain pixel as the center, and a conversion target frame is searched for a part which has the same size as this block and includes pixels having pixel values close to the extracted block. This search is conducted to a sub-pixel precision (for example, see M. Shimizu et al., "Precise Sub-pixel Estimation on Area-based Matching," in Proc. IEEE International Conference on Computer Vision, pp. 90-97, 2001.) After the search, the center of a found corresponding block is set as a corresponding point. As a result, a point A on a screen corresponding to another frame is associated with a point B corresponding to the conversion target frame as the same position of an object. This associating algorithm will be referred to as a block matching method hereinafter. This association is expressed by a motion vector which has the point A as a start point and the point B as an end point. Since the search is conducted to a sub-pixel precision, the start point of the motion vector corresponds to a position of a pixel, but the end point corresponds to a position where no pixel exists. Such motion vectors are calculated for all pixels of the low-resolution image, and motion vectors having each pixel on each of other low-resolution images as a start point to the conversion target frame are detected. After the motion vectors to the conversion target frame are obtained, the pixel values of the start points are allocated at the end points of the respective motion vectors as sampling values of the conversion target frame. Finally, from the non-uniformly allocated sampling points and sampling values at these points, sampling values of pixels, which are uniformly allocated in a grid pattern, of a high-resolution image are calculated. A large number of such conversion (reconstruction) methods are available, and for example, a Non-uniform interpolation method, POCS method, ML method, and MAP method are known (for example, see S. C. Park et al., "Super-Resolution Image Reconstruction: A Technical Overview," IEEE Signal Processing Magazine, pp. 21-36, May 2003.)

The conventional method, for example, the method described in the related art, searches the conversion target frame for corresponding points with reference to respective pixels on other frames. This method suffers from the following two problems. As the first problem, since the densities of corresponding points found on the conversion target frame differ according to location, the reconstruction performance of an output image is not stable. As the second problem, since corresponding points found on the conversion target frame readily include those with low reliability, strong noise tends to be generated.

BRIEF SUMMARY OF THE INVENTION

In accordance with an aspect of the invention, there is provided a resolution conversion apparatus for N-dimensional images (N: a natural number) comprising: a first input unit configured to input target image data which is a set of first coordinate values and first pixel values at the first coordinate values; a second input unit configured to input search image pattern data which is a set of second coordinate values and second pixel values at the second coordinate values; a third input unit configured to input an ideal corresponding point density function which uses N-dimensional coordinate values and calculates density values of ideal corresponding points; an allocating unit configured to allocate on the N-dimensional space a set of the ideal corresponding points according to the density values; a first acquisition unit configured to acquire, from the target image data, an input image pattern including pixel values within a predetermined range with reference to each of the ideal corresponding points; a second acquisition unit configured to acquire, as a plurality of candidate image patterns, from the search image pattern data, a first candidate image pattern including pixel values within the predetermined range, which corresponding to the predetermined range used in the first acquisition unit, with reference to each of the second coordinate values; a finding unit configured to find, from the search image pattern data, an estimated image pattern as a second candidate image pattern of the candidate image patterns which has a smaller difference from the input image pattern than other candidate image patterns; a first setting unit configured to set pixel values of positions corresponding to the ideal corresponding points in the estimated image pattern as pixel values at the ideal corresponding points; and a conversion unit configured to convert a resolution of the target image data using the N-dimensional coordinate values and the pixel values corresponding to the N-dimensional coordinate values.

BRIEF DESCRIPTION OF THE SEVERAL VIEWS OF THE DRAWING

FIG. 1 is a flowchart showing an example of sampling rate conversion based on POCS;

FIG. 3 is a view showing a setting example of ideal corresponding points on a conversion target frame;

FIG. 4 is a view showing a state in which the positions of the ideal corresponding points on the conversion target frame are associated with pixel positions on other frames;

FIG. 5 is a view showing a state in which the positions of the ideal corresponding points are corrected based on estimated phase shifts;

FIG. 12 is a view showing an example of an ideal corresponding point density function;

FIG. 13 is a view showing an example in which a reference block is generated from the position of an ideal corresponding point in step S1105 in FIG. 11;

FIG. 14 is a view showing an example of the candidate positions of a search for the conversion target frame itself in step S1107 in FIG. 11;

FIG. 15 is a view showing an example of the candidate positions of a search when the edge direction is close to a vertical direction in step S1107 in FIG. 11;

FIG. 16 is a view showing an example of the candidate positions of a search when the edge direction is close to a horizontal direction in step S1107 in FIG. 11;

FIG. 17 is a view for explaining a state in which block errors for five points are evaluated, and a phase shift of a smallest block error is selected;

FIG. 18 is a view for explaining a method which can obtain a more precise evaluation result than the method described using FIG. 17, and uses block errors for five points;

FIG. 19 is a view showing function fitting when an error function is a quadratic function.

DETAILED DESCRIPTION OF THE INVENTION

Figure 2:
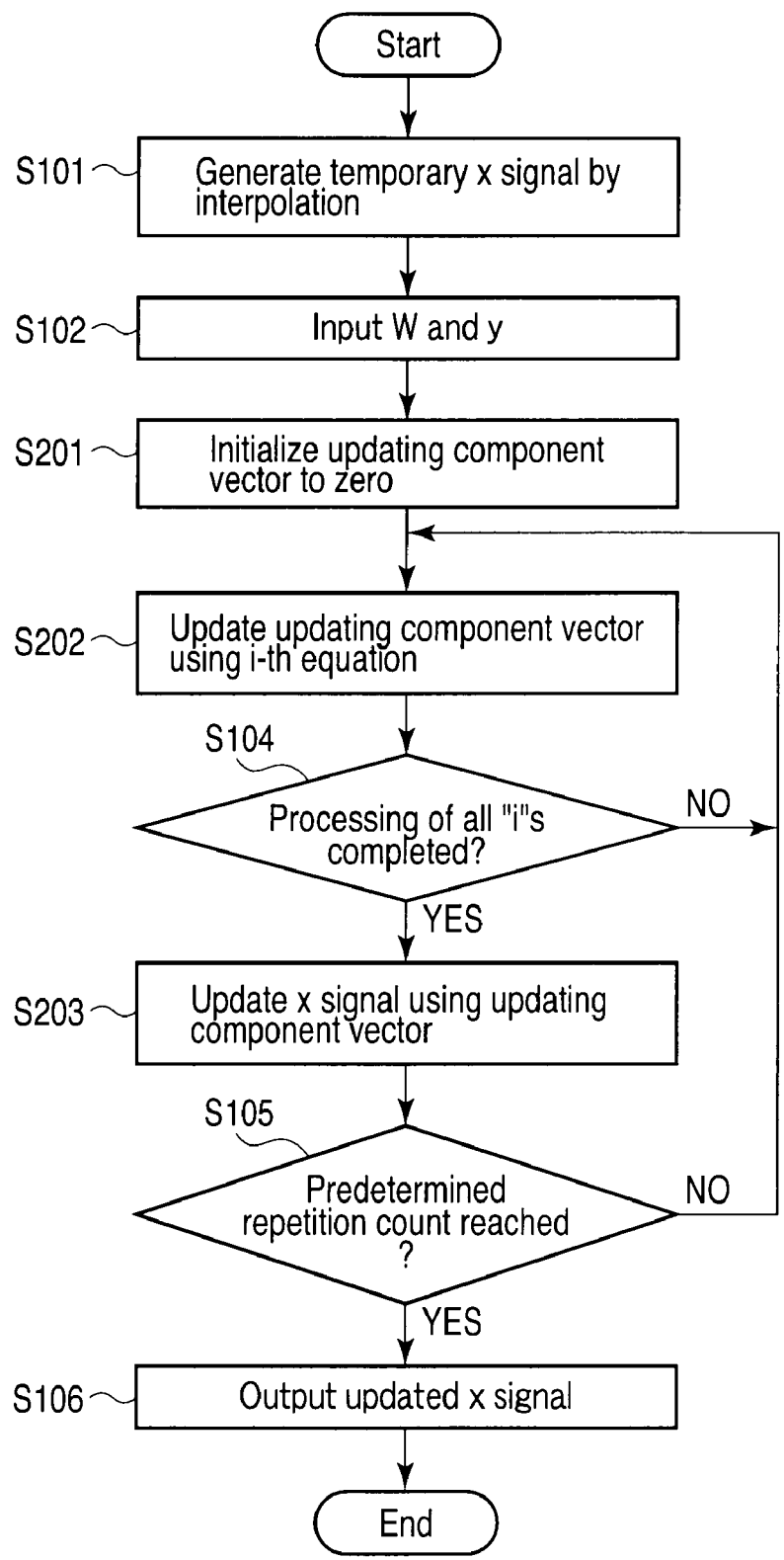
FIG. 2 is a flowchart showing an example of sampling rate conversion based on MAP.

A resolution conversion apparatus, method, and program according to an embodiment of the present invention will be described in detail hereinafter with reference to the drawing. In the embodiment to be described hereinafter, the same parts denoted by the same reference numerals execute the same operations, and a repetitive description thereof will be avoided.

An overview of this embodiment will be described first.

The fundamental reason for the aforementioned problems lies in that the conversion target frame is searched for corresponding points with reference to respective pixels on other frames. In order to solve these problems, from another view, i.e., in place of searching the conversion target frame for corresponding points, the allocation of corresponding points to be set on the conversion target frame may be determined in advance, and points that match these corresponding points may be searched on other frames. More specifically, for example, ideal corresponding points are allocated at the same density as pixels of an output resolution. A block of an input resolution to have each of the ideal corresponding points as the center is generated. All available other frames are searched for an image pattern which best matches that in the block. Finally, a pixel located at the center of the found image pattern is determined as that corresponding to the ideal corresponding point, thus obtaining information required for reconstruction. This method will be referred to as an ideal corresponding point method hereinafter.

Using the ideal corresponding point method, the aforementioned problems can be solved. However, since the search processing using all available frames has to be executed for all the allocated ideal corresponding points, an amount of computation considerably increases compared to the conventional method.

Calculations made in the ideal corresponding point method do not always improve the subjective reconstruction quality. Since humans have a low visual acuity on a part falling outside a region of interest, the reconstruction quality of such region imposes nearly no influence on the subjective reconstruction quality except for a case in which the reconstruction quality is too low, in which case, the region of interest is changed. Also, in the case of a pattern from which new information cannot be obtained even using the ideal corresponding point method, such as a pattern for which a sufficiently high quality is obtained even by simple interpolation, calculations based on the ideal corresponding point method need not be applied.

The basic idea of this embodiment is to estimate a degree of improvement of the subjective reconstruction quality, and to execute the aforementioned ideal corresponding point method while controlling the allocation densities of ideal corresponding points based on the estimated degree. A high-resolution image can be reconstructed to have high subjective quality while suppressing the amount of computation by applying control so that ideal corresponding points are allocated on a region where the improvement of the subjective reconstruction quality is expected, and ideal corresponding points are not allocated on a region where the improvement cannot be expected.

Note that resolution conversion handled in this embodiment is not limited to a two-dimensional image, and includes, for example, one-dimensional conversion that expands or shrinks an image in a specific direction, two-dimensional image conversion that expands or shrinks an image in the horizontal and vertical directions, moving image or three-dimensional boxel image conversion that expands or shrinks an image in directions of a two-dimensional plane and time or a two-dimensional plane and depth, and three-dimensional boxel moving image conversion that expands or shrinks an image in directions of a two-dimensional plane, depth, and time. The term image also includes a still image. The coordinate system of an image is considered as an N-dimensional space (N: a natural number). Typically, a pixel is handled as a small range within the N-dimensional space (N: a natural number), and a pixel value is handled as an integral value of signal intensities sampled during only a predetermined time period within the range of a pixel. The central position of a pixel will be especially referred to as a pixel position hereinafter, for the sake of simplicity. Even when the coordinate system includes a time axis, as in a moving image, sampling of a pixel value is implemented by integrating signals for a certain time (shutter speed). Note that pixels need not always be densely allocated. For example, in resolution conversion of a moving image, a space where pixels are to be allocated has three dimensions; the horizontal, vertical, and time directions. At this time, when the shutter speed is lower than a frame rate, a gap appears in the time direction. For example, when an image sensing system also adds a part of light of a neighboring pixel to an integral value, pixels overlap each other. A small range within the N-dimensional space will be referred to as a pixel hereinafter as well as these cases.

According to the resolution conversion apparatus, method, and program of the embodiment, a high reconstruction precision can be obtained while suppressing an increase in an amount of computation and noise.

(Reconstruction Method of High-Resolution Image Using Corresponding Points)

A method of reconstructing an image of an output resolution by resolution conversion will be described first. Next, a method of enhancing the reconstruction precision of this resolution conversion will be described.

In resolution conversion, it is considered that respective pixels of an input resolution are generated by applying, for example, conversion to an image of an output resolution due to blurring, down sampling (or up sampling), and noise, thereby reconstructing an image of an original output resolution. An index $i=\{1, 2, 3, \ldots, L\}$ is assigned to each pixel of an input image, and input pixel values are expressed by:

$$y_1, y_2, y_3, \quad (1)$$

(If a pixel is not a scalar value, y is expressed as a column vector.) For example, if a pixel is given by three dimensions R, G, and B, y is expressed by a three-dimensional column vector. An index $j=\{1, 2, 3, \ldots M\}$ is also assigned to an output signal, and pixel values are expressed by:

$$x_1, x_2, x_3, \quad (2)$$

Conversion applied to an image of an output resolution is called a Point Spread function, and an input pixel value is expressed by a weighted sum of output pixel values. Values to be calculated are pixel values expressed by:

$$x_1, x_2, x_3, \quad (3)$$

At this time, a weighting coefficient for each index i is given by:

$$w_{ij} \quad (4)$$

At this time, we have:

$$y_i = \sum_j w_{ij} x_j \quad (5)$$

If relational expressions that allow to estimate the weighted sum values of output pixel values are obtained in addition to an input image, indices are assigned to these expressions to add formulas, and a value L can be increased by the number of added formulas. A method of obtaining this relational expression will be described later.

A vector given by:

$$x=(x_1, x_2, x_3, \ldots, x_M)^T \quad (6)$$

a vector given by:

$$y=(y_1, y_2, y_3, \ldots, y_L)^T \quad (7)$$

and a matrix given by:

$$W=((w_{11}, w_{12}, \ldots, w_{1M})^T, (w_{21}, w_{22}, \ldots, w_{2M})^T, \ldots)^T \quad (8)$$

are introduced, and formulas for respective indices i are expressed in combination by:

$$y=Wx \quad (9)$$

As a method of assigning x, a method of calculating x using a pseudo-inverse matrix by:

$$x=W^+y \quad (10)$$

may be used. In place of directly assigning x using the pseudo inverse matrix, for example, the POCS or MAP method can be used. Estimation of x using W and y will be referred to as "RECONSTRUCTION" hereinafter. A practical example of the RECONSTRUCTION will be described below.

(Interpolation)

The POCS or MAP method often executes optimization based on iterative calculations, and iterative optimization requires ideal x as an initial value. Temporary x can be generated by, for example, interpolation of an input image. An interpolation method to be used is not particularly limited and, for example, the following method can be used.

(A) Linear Interpolation

Interpolation is made using a given two points. The two points to be used in interpolation are preferably as close to a point to be interpolated as possible. The positions of the given two points are expressed by:

$$a_1, a_1+1 \quad (11)$$

their pixel values are expressed by:

$$y_1, y_2 \quad (12)$$

and the position of the point to be interpolated is expressed by:

$$a_1+c \quad (13)$$

At this time, an interpolated value can be calculated using:

$$y_c = y_1 + c(y_2 - y_1) \quad (14)$$

(B) Cubic Convolution Method

Interpolation is made using four points allocated at given equal intervals. Assume that the four points used in interpolation are allocated within a range of 2 or less having a position to be interpolated as the center. An interpolated value is obtained by multiplying the respective points by the value of a weighting kernel which has the position to be interpolated as the center, and is given by:

$$w(d) = \begin{cases} (\gamma+2)|d|^3 - (\gamma+3)|d|^2 + 1 & |d| < 1 \\ \gamma|d|^3 - 5\gamma|d|^2 + 8\gamma|d| - 4\gamma & 1 \leq |d| < 2 \\ 0 & \text{otherwise} \end{cases} \quad (15)$$

where d is the distance of each point from the position to be interpolated. γ is a parameter used to control an interpolation function and, for example, $\gamma=-1.0$ or $\gamma=-0.5$.
and then calculating their sum.

(Back Projection and POCS)

An example of the sequence of the RECONSTRUCTION based on the POCS will be described below with reference to FIG. 1. An algorithm of the RECONSTRUCTION is as follows. This algorithm is executed by, for example, a calculation unit 1005 in FIG. 1 (to be described later).

(Step 1) Temporary x is generated (step S101). Temporary x can be generated by, for example, interpolation of an input image. As the interpolation method, for example, the linear interpolation and cubic convolution method can be used.

(Step 2)

$$y=Wx \quad (16)$$

The i-th equation that configures equation (16) can be written in the form of:

$$y_i = W_i x \quad (17)$$

Note that $$W_i = (w_{i1}, w_{i2}, \ldots, w_{iM}) \quad (18)$$

is a horizontal vector defined by arranging weights, and $$y_i, W_i \tag{19}$$

is given as an input (step S102). In order to calculate x which satisfies respective equations of:

$$y_i = W_i x \tag{20}$$

with a limited influence of noise, the POCS separately gives a step size given by:

$$\beta_i \tag{21}$$

and a constant given by:

$$\delta_i \tag{22}$$

and executes the following iterative calculations (example without parallel processing: steps S103 and S104). Note that $$\hat{x} \tag{23}$$

means an estimated value of x.

$$\hat{x} \leftarrow \begin{cases} \hat{x} + \beta_i(y_i - W_i\hat{x} + \delta_i) & \text{if } y_i - W_i\hat{x} + \delta_i < 0 \\ \hat{x} + \beta_i(y_i - W_i\hat{x} - \delta_i) & \text{if } y_i - W_i\hat{x} - \delta_i > 0 \\ \hat{x} & \text{otherwise} \end{cases} \tag{24}$$

A step size given by:

$$\beta_i \tag{25}$$

and a constant given by:

$$\delta_i \tag{26}$$

may assume identical values for all "i"s, as given by:

$$\beta_i=1, \delta_i=10 \tag{27}$$

or they may assume different values for respective equations, as given by:

$$\beta_i=1/\|W[i]\|^2 \tag{28}$$

(Step 3) Step 2 is repeated by the separately defined number of times (step S105).
(Step 4) An obtained estimated image:

$$\hat{x} \tag{29}$$

is output (step S106).
(Simple RECONSTRUCTION)
Note that the following weighted addition method may be used in place of the strict RECONSTRUCTION. In the weighted addition method, an appropriate kernel matrix K is prepared, and an image x for respective pixels is estimated using:

$$x=Ky \tag{30}$$

The kernel matrix K theoretically uses a pseudo inverse matrix of W given by:

$$W^+ \tag{31}$$

However, the pseudo inverse matrix requires many calculations. Hence, instead of computing a pseudo-inverse matrix, represent each output pixel as a weighted sum of input pixels near the output pixel, and represent the weights of all output pixels as a matrix, K. Note that each row of K represents coefficients of interpolation, and a total value of its elements becomes 1.
(RECONSTRUCTION Based on MAP)
Reconstruction of x can also use characteristics of a natural image, for example, knowledge about similar luminance values of neighboring pixels. As one example, estimation of x based on the MAP method to be described below is known.

The MAP method will be described below according to the sequence shown in FIG. 2. Note that this sequence is executed by the calculation unit 1005.
(MAP)
(Step 1) Temporary x is generated (step S101). Temporary x can be generated by, for example, interpolation of an input image.
(Step 2) Assuming an energy function which combines a first term whose energy becomes higher with increasing error with respect to:

$$y=Wx \tag{32}$$

and a second term whose energy becomes higher with increasing error of an image x with respect to general characteristics of a natural image, which is prepared in advance, and the image x that minimizes this energy function is explored. For example, assuming that luminance values of neighboring pixels do not change much as the general characteristics of the natural image, the energy function can be expressed by:

$$E = \|y - Wx\|_1 + \sum_m \lambda_m \|x - P_m x\|_1 \tag{33}$$

where subscript "1" of a norm represents an L1 norm, $\lambda_m$ is a weight for the second term, and $P_m$ is a matrix that represents a translation. m represents possible variations of translations. Assuming two different translations:
$P_1$: horizontal translation
$P_2$: vertical translation
the second term yields a value obtained by calculating sums of the magnitudes of differences between neighboring pixels in the vertical and horizontal directions, and weighting the total value by $\lambda$.
As a method of minimizing E, for example, a steepest descent method is available. The steepest descent method is a method of repeating an operation for advancing an estimated value of x given by:

$$\hat{x} \tag{34}$$

by a step multiplied by $-\beta$ in the gradient direction of the energy function, and the estimated value can be updated by:

$$\hat{x} \leftarrow \hat{x} - \beta \begin{Bmatrix} W^T \text{sign}(Wx - y) + \sum_m \lambda_m (I - P_m)^T \\ \text{sign}(x - P_m)^T \text{sign}(x - P_m x) \end{Bmatrix} \tag{35}$$

A practical sequence is as follows. W and y are given as inputs (step S102). When the above formula is executed intact, a buffer (temporary storage unit 1004) which holds a gradient vector of the energy function is prepared and is initialized to zero (step S201). Then, the gradient vector of the energy function is updated (steps S202 and S104) by evaluating formulas of respective rows of a matrix given by:

$$W^T \text{sign}(Wx-y) \tag{36}$$

and those of respective rows of a matrix given by:

$$\lambda_m (I-P_m)^T \text{sign}(x-P_m x) \tag{37}$$

After the evaluation of all the formulas is complete, the evaluation result is multiplied by $\beta$, and that product is subtracted from an estimated value given by:

$$\hat{x} \tag{38}$$

In place of executing the above formulas intact, by sequentially applying the above update formulas to have, as formulas that configure the gradient direction of the energy function, formulas of respective rows given by:

$$W^T \text{sign}(Wx-y) \tag{39}$$

and those of respective rows given by:

$$\lambda_m (I-P_m)^T \text{sign}(x-P_m x) \tag{40}$$

(by excluding formulas from the gradient term except for those of interest), an estimated value given by:

$$\hat{x} \tag{41}$$

may be updated as needed (in this case, the sequence is the same as that of steps S103 and S104 described as the POCS). Note that an initial value:

$$\hat{x} \tag{42}$$

is given by applying the linear interpolation, cubic convolution method, or the like to the conversion target frame.

(Step 3) Step 2 is repeated by the separately defined number of times (step S105).

(Step 4) An image output unit 1003 outputs an estimated high-resolution image (step S106), which is given by:

$$\hat{x} \tag{43}$$

Note that the energy function of the MAP method described above is an example, and the present invention is not limited to such specific energy function. For example, all the L1 norms of the energy function can be replaced by other norms (e.g., L2 norms). For example, the second term as a priori knowledge may not be used. This method is often especially called an ML method, and corresponds to the above energy function including $\lambda_m=0$.

(Addition of Relational Expression Using Ideal Corresponding Points: Introduction)

With the aforementioned sequence, the output image x can be estimated. The estimation precision of the output image depends on how many dimensions of selectable solutions x the formulas used for respective "i"s used in estimation can reduce (how much the rank of W can be raised), and how precise the formulas are. An overview of why this is so follows. When the number of dimensions of the selectable solutions x is not zero, the RECONSTRUCTION, e.g. the POCS, selects one of solutions (strictly speaking, approximate solutions), and returns the selected solution. However, in the RECONSTRUCTION stage, the characteristics of an image is not considered, and an estimated output image is selected from the selectable solutions x randomly (based on an inappropriate reference when viewed from the user). This does not pose a problem if the number of selectable solutions x is small. However, when the number of dimensions of the selectable solutions x becomes large, the number of choices of the solutions x increases, and a desired image is unlikely to be selected. When the MAP method to be described later is used in the RECONSTRUCTION, an image can be selected using knowledge about the image. Even in such case, when the number of dimensions of the selectable solutions x becomes large, a desired output image is unlikely to be selected. In consideration of such facts, it is a very important issue to reduce the number of dimensions of the selectable solutions x in the resolution conversion using the RECONSTRUCTION.

In order to reduce the number of dimensions of the selectable solutions, the number of equations:

$$y_i = \sum_j w_{ij} x_j \tag{44}$$

can be increased. However, at this time, formulas to be added cannot be arbitrary ones. In the conventional method, motions from other frames to the conversion target frame are calculated and associated. According to "S. C. Park et al., "Super-Resolution Image Reconstruction: A Technical Overview," IEEE Signal Processing Magazine, pp. 21-36, May 2003.", the conventional super-resolution uses estimation of complicated motions for respective objects so as to calculate precise motions. However, even when time-consuming complicated image processing is executed so as to calculate precise motions, the following problems (A) and (B) remain unsolved. (A) It is unknown whether or not a phase shift included in the obtained precise motion is suited to the resolution conversion. (B) Since some frames do not include any corresponding positions due to a deformation or movement of an object itself, it is inevitable that formulas to y=Wx will be wrongly added due to mixing of noise such as an estimation error of a motion vector.

In order to solve these problems, the basic idea of this embodiment is as follows. In this embodiment, the direction of the estimation of corresponding points is reversed. That is, in place of calculating motions from other frames to the conversion target frame, points (ideal corresponding points) are set in advance on the conversion target frame, as shown in FIG. 3, and pixels (corresponding pixels) corresponding to the ideal corresponding points on other frames are calculated, as shown in FIG. 4. However, since a search for a one-pixel unit is conducted if a corresponding pixel is searched for with reference to each ideal corresponding point, a decimal pixel (sub-pixel) difference remains between the ideal corresponding point and the point that corresponding to the obtained pixel on the conversion target frame. Hence, after the corresponding pixels are calculated, the positions of the ideal corresponding points are corrected in correspondence with the corresponding pixels with reference to these corresponding pixels, as shown in FIG. 5, or precise sub-pixel positions are calculated on images of other frames, and pixel values corresponding to the calculated positions are generated by interpolation. In this embodiment, upon calculating the corresponding pixels, appropriate ranges are set on all of available other frames to select pixels within these ranges as corresponding pixel candidates. After that, only candidates which are more likely to correspond to the ideal corresponding points (to have relatively high reliability) are left, and other candidates (to have relatively low reliability) are excluded. As a result, only candidates with relatively high reliability of all of other frames can be left, and the possibility of mixing of noise can be greatly reduced. That is, the aforementioned problem (B) can be solved. Furthermore, since the ideal corresponding points can be arbitrarily set on the conversion target frame in advance, if the respective ideal corresponding points are allocated to obtain corresponding points suited to the resolution conversion, the problem (A) can also be solved. The method of this embodiment will be referred to as an ideal corresponding point method hereinafter. In the above description, "other frames" are used to explain the method of this embodiment for the purpose of comparison with the conventional method. However, "other frames" need not particularly be used as long as image data which have information of pixels sensed at positions deviated by sub-pixels are used. For example, the conversion target frame itself as a target may be used, or image frames sensed by other cameras at the time of use of multi-view cameras may be used. Or images sensed by another device at quite different times may also be used. In this way, there is no peculiar reason for limiting data serving as search targets to other frames. Hence, in this embodiment, these target data will be correctively referred to as "search image pattern data" hereinafter.

Figure 6:
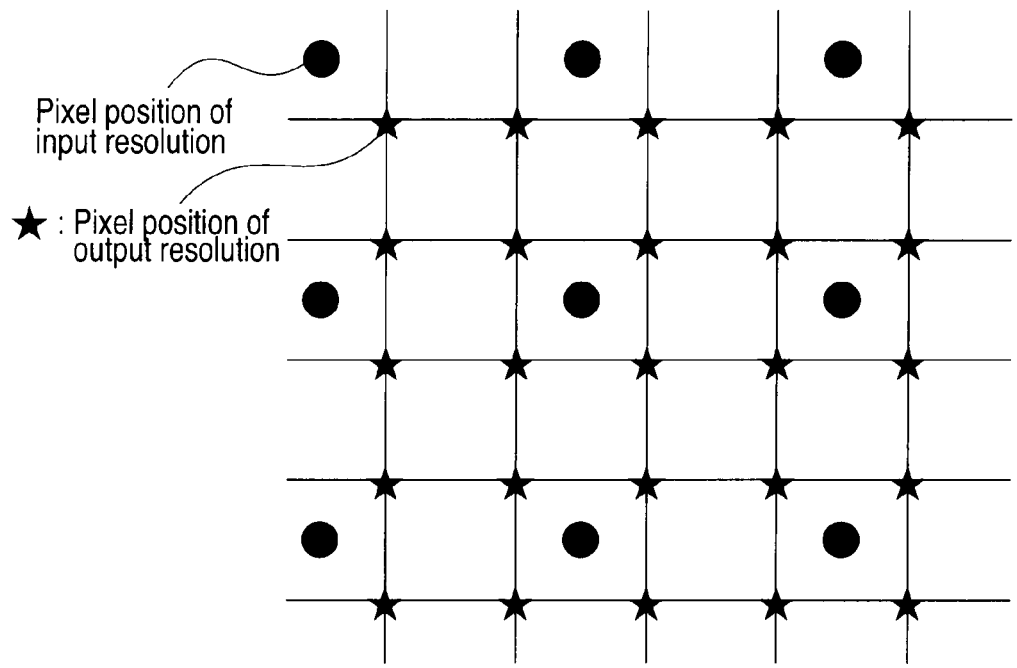
FIG. 6 is a view showing the positional relationship between pixel positions of an input resolution and those of an output resolution.
Figure 7:
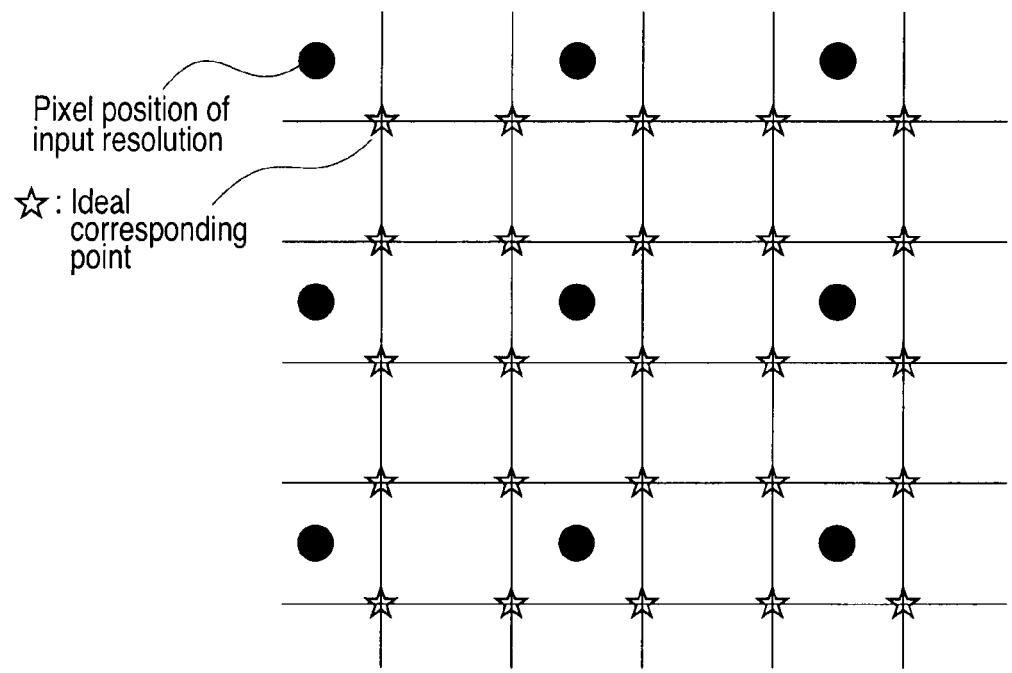
FIG. 7 is a view showing an example in which ideal corresponding points are allocated in correspondence with the pixel positions of the output resolution in FIG. 6.
Figure 8:
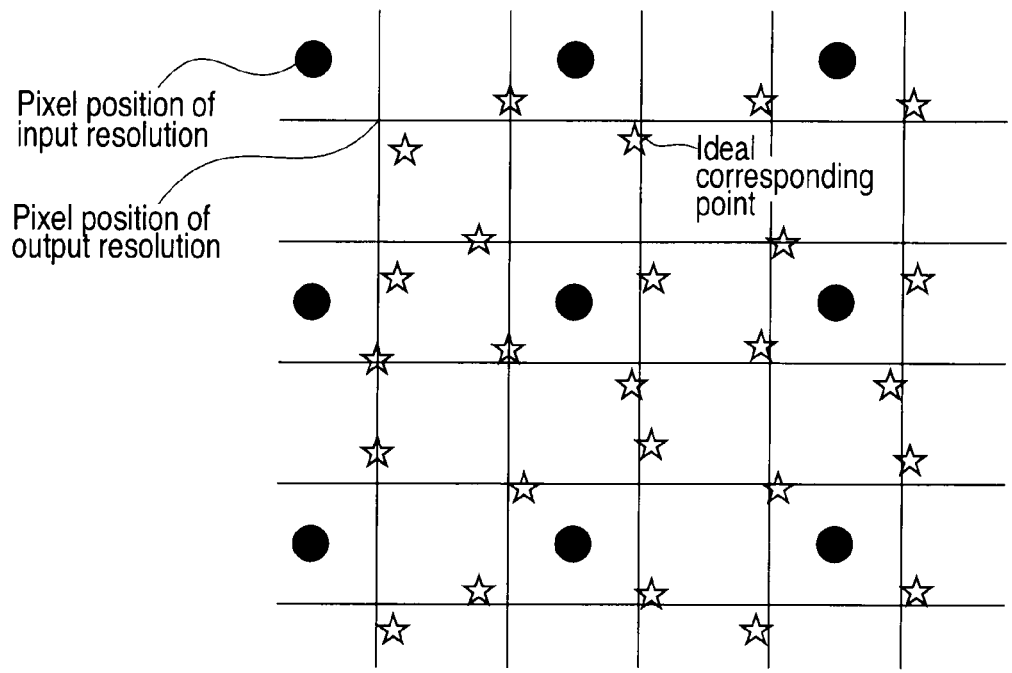
FIG. 8 is a view showing an example of the positions of the ideal corresponding points obtained after the positions of the ideal corresponding points in FIG. 7 are corrected.
Figure 9:
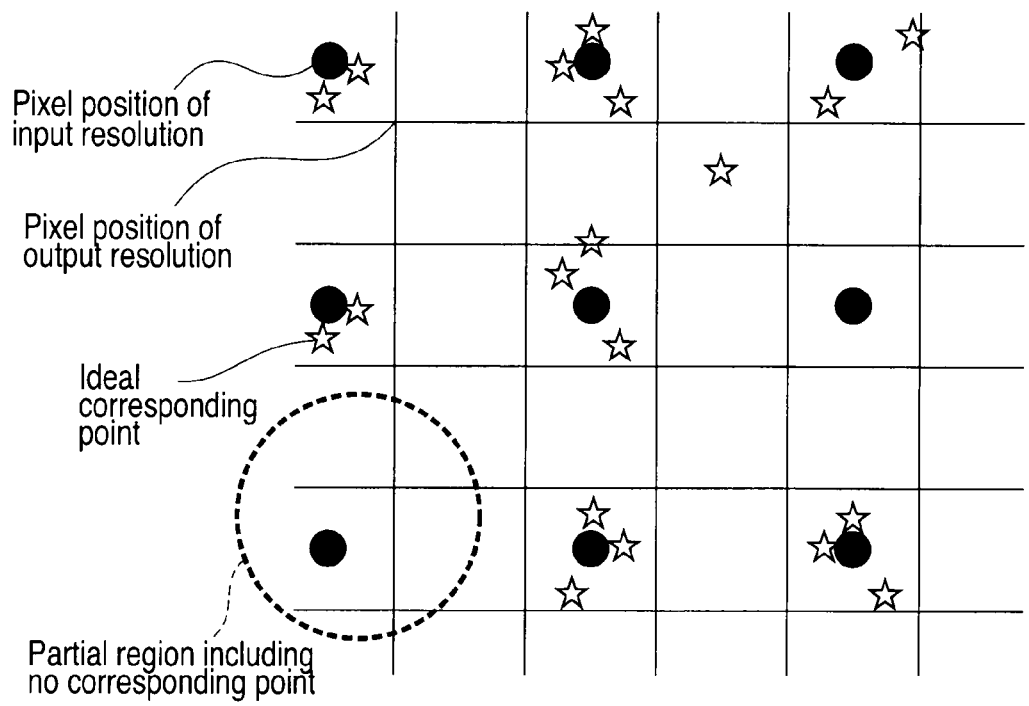
FIG. 9 is a view showing an example of the positions of corresponding points obtained by block matching with reference to integer pixel positions of an input resolution based on the conventional method.

In the ideal corresponding point method, as corresponding points of the resolution conversion, for example, it is desired to allocate the corresponding points at the positions of pixels of an output resolution (note that the position of a pixel indicates the central position of a range of a pixel). Therefore, respective ideal corresponding points need only be allocated at the positions of pixels of the output resolution if an amount of computation is not regarded. More specifically, when the positional relationship between pixels of the input and output resolutions is as shown in FIG. 6, ideal corresponding points can be allocated, as shown in FIG. 7, in correspondence with the positions of respective pixels of the output resolution. When a corresponding pixel search is conducted, and respective ideal corresponding points undergo sub-pixel difference correction in correspondence with corresponding pixels, the finally obtained corresponding points are slightly deviated from the positions of respective pixels of the output resolution, as shown in FIG. 8. However, when corresponding points are calculated by the conventional method, the allocation of corresponding points readily suffers a strong density variation, as shown in, e.g., FIG. 9. However, according to the method of this embodiment, even after sub-pixel difference correction, the allocation of corresponding points suffers less of a density variation, and the problem (A) can be solved or can be greatly alleviated.

However, in the ideal corresponding point method, if ideal corresponding points are densely allocated at the same interval as the output resolution, corresponding points have to be searched for in correspondence with all of the allocated ideal corresponding points, resulting in a large amount of computation. On the other hand, when the ideal corresponding points are uniformly allocated, all these points do not contribute to improvement of subjective reconstruction quality. Since humans have low visual acuity on a part falling outside a region of interest, the reconstruction quality of such region imposes nearly no influence on the subjective reconstruction quality except for a case in which the reconstruction quality is too low in which case, the region of interest is changed. Also, in the case of an image pattern from which new information cannot be obtained even using the ideal corresponding point method such as a flat region of an image for which a sufficiently high quality is obtained even by simple interpolation, calculations based on the ideal corresponding point method need not be applied. Hence, in this embodiment, the ideal corresponding point method is executed while controlling to allocate ideal corresponding points on a region where improvement of the subjective reconstruction quality is expected, and not to allocate ideal corresponding points on a region where such improvement is not expected. According to this embodiment, a high-resolution image can be reconstructed to have high subjective quality while suppressing the amount of computation.

(Addition of Relational Expression Using Ideal Corresponding Points: Method)

Figure 10:
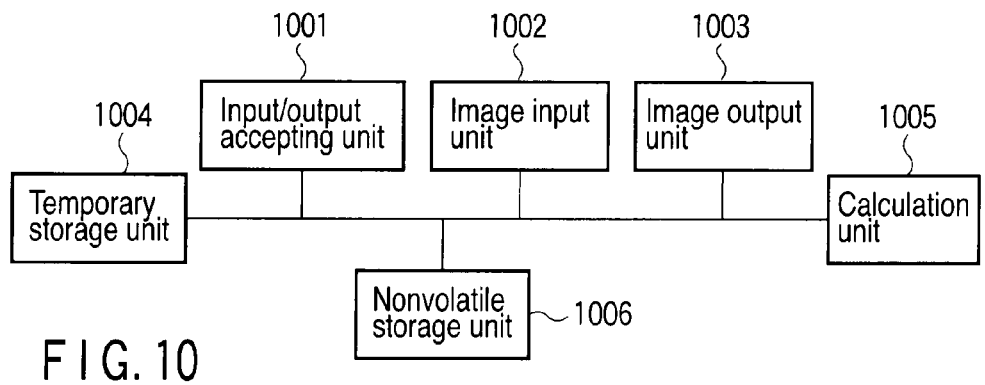
FIG. 10 is a block diagram of a resolution conversion apparatus according to an embodiment.

A signal processing apparatus of this embodiment will be described below with reference to FIG. 10. FIG. 10 shows an example of the arrangement when the signal processing apparatus is implemented using a computer (including a TV, DVD player, and hard disk recorder) using a general-purpose CPU.

The signal processing apparatus of this embodiment includes an input/output accepting unit 1001, image input unit 1002, image output unit 1003, temporary storage unit 1004, calculation unit 1005, and nonvolatile storage unit 1006.

The input/output accepting unit 1001 accepts a user's instruction. The input/output accepting unit 1001 accepts an instruction input from, for example, a mouse, keyboard, or remote controller. The input/output accepting unit 1001 accepts a signal that instructs to launch a program.

The image input unit 1002 accepts target image data as a set of N-dimensional coordinate values on an N-dimensional space and pixel values at these N-dimensional coordinate values, and one or more search image pattern data, serving as a search target or targets, as a set or sets of N-dimensional coordinate values on the N-dimensional space and pixel values at these N-dimensional coordinate values.

The nonvolatile storage unit 1006 stores programs to be described later with reference to the drawing. The nonvolatile storage unit 1006 is, for example, a hard disk or a ROM. The nonvolatile storage unit 1006 may store the aforementioned image data and search image pattern data in advance.

The temporary storage unit 1004 temporarily stores a program read out from the nonvolatile storage unit 1006 in response to a user's instruction from the input/output accepting unit 1001, and provides the stored program to the calculation unit 1005. The temporary storage unit 1004 can temporarily store the calculation result of the calculation unit 1005.

The calculation unit 1005 receives the program from the temporary storage unit 1004, and executes that program. The calculation unit 1005 implements all principal operations of the resolution conversion apparatus of this embodiment.

The image output unit 1003 outputs the result obtained by the calculation unit 1005. The image output unit 1003 is, for example, a monitor.

Figure 11:
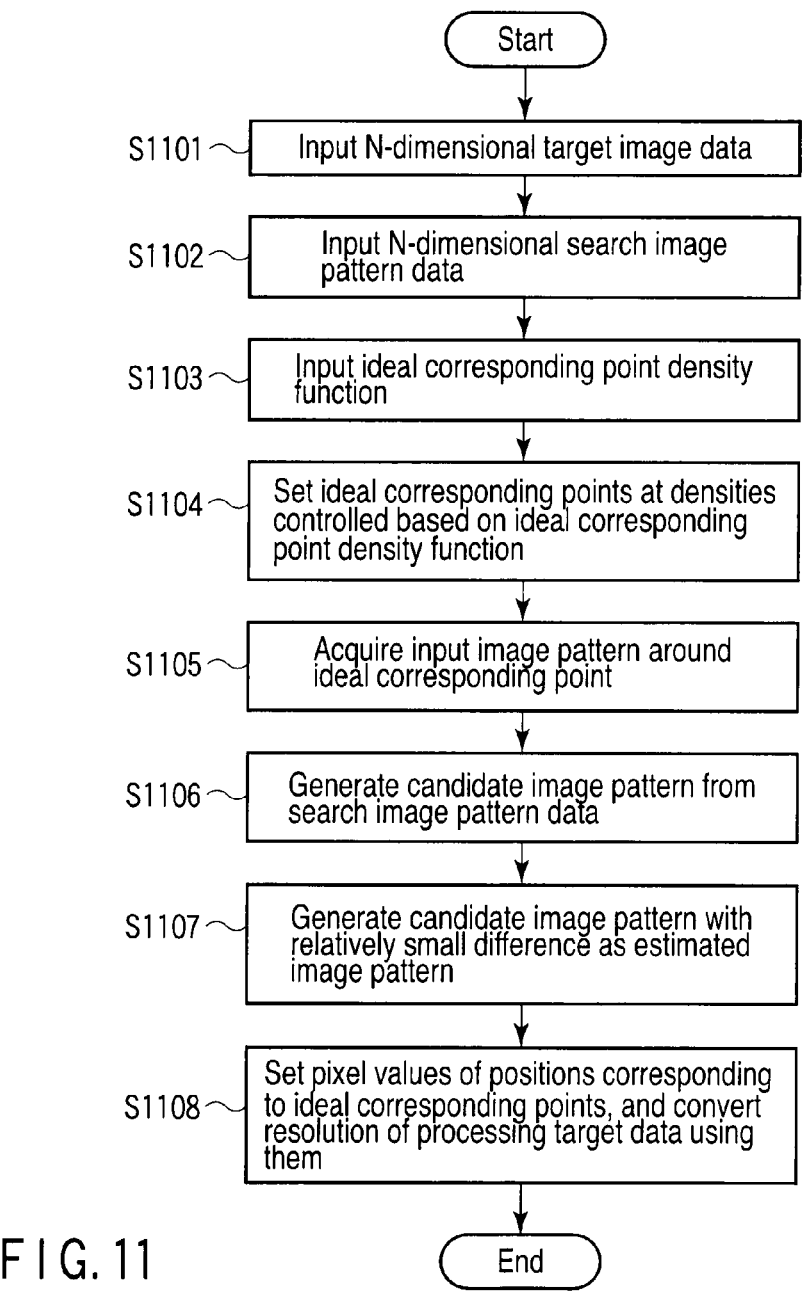
FIG. 11 is a flowchart showing an example of the operation of the resolution conversion apparatus according to the embodiment.

An input to the resolution conversion apparatus of this embodiment may be (a) the target image data only, or (b) a plurality of image data including the target image data and image data obtained from other angles or at other times to the target image data. An output from the resolution conversion apparatus of this embodiment is image data obtained by applying resolution conversion to the target image data. FIG. 11 is a flowchart showing an example of the operation of the resolution conversion apparatus of this embodiment. The sequence used in the resolution conversion method of this embodiment is as follows. In the following description, note that an "input pattern" is data obtained by arranging pixel values in a block of an appropriate size (for example, 3×3 pixels obtained by adding upper, lower, and right, and left pixels) having an ideal corresponding point as the center (for example, nine pixel values, which are interpolated from the target image data). Also, a "candidate image pattern" is data obtained by arranging pixel values in a block having the same size as the input pattern (for example, nine pixel values, which are not interpolated but copied from search image pattern data). Normally, a plurality of candidate image patterns are extracted. Furthermore, an "estimated image pattern" is data obtained by arranging pixel values in each of the blocks which are found as a result of a search for candidate image patterns with smaller errors (for example, SSD or AD values) from the input image pattern (for example, nine pixel values). Also, a "block" is not particularly limited to a square, and may be a figure having an arbitrary shape such as a rectangle, circle, ellipse, or rhombus.

(Step 1) The image input unit 1002 inputs target image data (steps S1101 and S1102). The target image data can be used as both a target of the resolution conversion and search image pattern data. However, when other image data are input, the target image data need not always be used as the search image pattern data. Other input image data can also be used as the search image pattern data (step S1102).

(Step 2) The calculation unit 1005 determines positions where corresponding points are to be set with respect to the input data (steps S1103 and S1104). Ideally, all points at positions where the number of selectable solutions x can be reduced if corresponding points are detected are to be set as ideal corresponding points. However, in consideration of an amount of computation, the number of ideal corresponding points is to be reduced as much as possible. Hence, an ideal corresponding point density function is considered (upon implementation, an ideal corresponding point need not be explicitly generated), and ideal corresponding points are allocated according to this function (no ideal corresponding points are set in a region with a function value "0") (step S1103). As an example of the ideal corresponding point density function, a function, which allocates ideal corresponding points densely at the center of a screen since it is more likely to attract attention, and lowers the density of ideal corresponding points as the position is separated farther away from the center, is available. FIG. 12 shows a practical example of such function for a two-dimensional image. In FIG. 12, respective axes represent horizontal and vertical axes, and parts that are darker have higher function values. A function value is given by, for example, a two-dimensional Gaussian function:

$$G_2(x,y)=\exp\{-((\Delta x)^2+(\Delta y)^2)/2\sigma^2\} \quad (45)$$

where σ is a parameter, and Δx and Δy are differences from the center of the screen. Note that at the time of step 2, pixel values at the set ideal corresponding points are unknown. The ideal corresponding point density function is stored in, e.g., the nonvolatile storage unit 1006.

(Step 3) Luminance patterns corresponding to the ideal corresponding points are acquired. More specifically, the calculation unit 1005 generates an input image pattern (to be referred to as a reference block hereinafter) in, e.g., a range (block) in the upper, lower, and right, and left directions, which is separately defined with reference to each ideal corresponding point, as a luminance pattern having the same pixel interval as the input resolution by interpolation (step S1105). FIG. 13 shows a practical example in a two-dimensional image. In step S1105, for example, if an ideal corresponding point is located at a position (7.6, 6.3) on a coordinate system of the input resolution, and a 3×3 pixel block having that position as the center is to be obtained, luminance values corresponding to nine points (6.6, 5.3), (7.6, 5.3), (8.6, 5.3), (6.6, 6.3), (7.6, 6.3), (8.6, 6.3), (6.6, 7.3), (7.6, 7.3), and (8.6, 7.3) are interpolated as an input image pattern. Note that the term "block" is used for the sake of convenience, but an arbitrary shape, for example, a circle, ellipse, or rhombus may be used in case of, e.g., a two-dimensional image in addition to a rectangle. If sub-pixel differences of ideal corresponding points determined by the ideal corresponding point density function have some kind of rules (e.g., the shape of the ideal corresponding point density function is determined in advance), coefficients required for interpolation calculations are calculated in advance, thus reducing the amount of computation.

(Step 4) The calculation unit 1005 sets an appropriate search range on respective search image pattern data (in the case of resolution conversion of respective frames of a moving image, for example, a target image frame and other frames), and extracts luminance patterns in respective blocks while shifting a block pixel by pixel within that range, thus generating candidate image patterns (step S1106). Of the generated candidate image patterns, blocks (estimated image patterns) having the lowest possible number of block errors from the reference block are searched for (step S1107). As the block error, for example, a sum total of differences of respective pixel values (for example, SSD or AD) or a normalization mutual correlation can be used. Upon conducting a search, in order to avoid the reference block itself from being selected, blocks which are located at positions having an L-infinity distance (Chebyshev distance) from a temporary sampling position, which is less than a separately defined threshold (for example, 0.5 pixel), may be excluded from search candidates. The search range may include the entire screen, or it may be limited to a part of the screen in consideration of an inter-frame moving range if, for example, other frames of a moving image are used as search image pattern data. Also, for example, when the target image data itself is used as search image pattern data, it is assumed that similar patterns are likely to appear in the vicinity of the reference block, and only several neighboring pixels may be used as a target. For example, if a two-dimensional image is used as a target, a search is conducted only for a range within several pixels (two or three pixels) in the vertical and horizontal directions having the reference block as the center, as shown in FIG. 14, and a block having a small block error is selected. Alternatively, a neighboring edge direction is estimated based on a ratio of output values of, e.g., horizontal and vertical edge detection filters, and search candidates may be limited to the edge direction, as shown in FIG. 15 or 16.

In step 4, as for blocks to be selected, as estimated image patterns, only one block having a minimum number of block errors may be selected, or all blocks having block errors equal to or smaller than a threshold may be selected (in this case, if all block errors exceed the threshold, no block is selected). Note that in this embodiment, association in step 4 has been explained using block matching. However, the present invention is not particularly limited to block matching, and other motion estimation methods that can attain association for respective pixels may be used, or a method of attaining association to a precision smaller than a pixel unit may be used and that result may be rounded off.

(Step 5) The calculation unit 1005 estimates difference between ideal corresponding points and the corresponding point of the estimated blocks (referred to as phase shifts), and corrects the ideal corresponding points (note that the correction step may be omitted). The estimation method of the difference (referred to as sub-pixel refinement hereafter) is not particularly limited. For example, methods of conducting a binary search on a two-dimensional image can be used. One of the methods based on a binary search is a method of repeating a binary search while increasing a precision like ½, ¼, and ⅛ in the horizontal and vertical directions, respectively. Alternatively, for example, letting (Δx, Δy) be the current estimated phase shift, an operation for evaluating block errors for five points (Δx, Δy), (Δx−ϵ, Δy), (Δx+ϵ, Δy), (Δx, Δy−ϵ), and (Δx, Δy+ϵ), or those for nine points (Δx, Δy), (Δx−ϵ, Δy−ϵ), (Δx−ϵ, Δy), (Δx−ϵ, Δy+ϵ), (Δx, Δy−ϵ), (Δx, Δy+ϵ), (Δx+ϵ, Δy−ϵ), (Δx+ϵ, Δy), and (Δx+ϵ, Δy+ϵ), and selecting a phase shift with a smallest block error may be repeated while reducing ϵ until a desired ϵ is reached. As ϵ described in this case, for example, "0.5" may be initially set, and a value obtained by multiplying a previous ϵ by 0.5 may be used as new ϵ in the subsequent operations.

For example, when block errors for five points are used, block errors between four points of candidate positions of ϵ=0.5 and an original position are evaluated (a block error at the original position can use a calculated value), and a phase shift with a smallest block error is selected, as shown in FIG.

17. The same operation is repeated for $\epsilon=0.25$ or less. As for evaluation of block errors for sub-pixel positions, a block having the same resolution as the input image is generated by interpolation, and is used for evaluation, as has been described above in generation of the reference block. However, only when block error evaluation is made for five points is there a phase shift that cannot be estimated by the aforementioned method of FIG. 17. If phase shifts have to be precisely calculated even with an extra processing time, every phase shift can be estimated using a method of FIG. 18 obtained by modifying the method of FIG. 17.

With the method of FIG. 18, estimation is practically made in the following sequence. That is, block errors between four points of candidate positions of $\epsilon=0.5$ and the original position are evaluated, and the block whose block error is the smallest is selected, as in the method of FIG. 17. These positions will be referred to as candidate positions of first $\epsilon=0.5$ hereinafter. Next, only when one of four points other than ($\Delta x$, $\Delta y$) is selected, four points of candidate positions of second $\epsilon=0.5$ including that point as the center are considered, and the block whose block error is the smallest is selected from them. Since two out of the four points of candidate positions of second $\epsilon=0.5$ overlap those of first $\epsilon=0.5$, only non-overlapping two points need only be evaluated in terms of calculations. After this operation, operations for $\epsilon=0.25$ or less are executed in the same sequence as that described using FIG. 17 above (for $\epsilon=0.25$ or less, no second search is required) For example, when a candidate position of second $\epsilon=0.5$ like ($\Delta x+0.5$, $\Delta y+0.5$) is selected, a position whose x- or y-coordinate is separated by 0.5 or more from ($\Delta x$, $\Delta y$) is often selected as a candidate position in the operation for $\epsilon=0.25$ or less. For example, if ($\Delta x+0.5$, $\Delta y+0.5$) is selected by evaluation for second $\epsilon=0.5$, four candidate points of $\epsilon=0.25$ include two points ($\Delta x+0.75$, $\Delta y+0.5$) and ($\Delta x+0.5$, $\Delta y+0.75$) which are separated by 0.5 or more from ($\Delta x$, $\Delta y$). Ideally, since it is expected that ($\Delta x$, $\Delta y$) is located at a position within 0.5 from a smallest block error point, these candidate positions may be omitted (of course, they may not be omitted since evaluation deviate from an ideal). Using the method of FIG. 18, the differences between the ideal corresponding points and the corresponding points of the estimated blocks in step 4 can be estimated precisely while suppressing the number of positions to be evaluated at the same time to a total of five points, i.e., the current estimation position and four points of candidate positions.

In addition to the method of repeating evaluation of block errors while increasing the precision of an estimated phase shift, when an estimation method using an error function of an interpolated signal pattern is used, for example, an appropriate parametric error curve (for example, a quadratic curve shown in FIG. 19) may be assumed in the horizontal and vertical directions, respectively, and a position where that curve assumes a minimal value may be calculated. Alternatively, assuming that an error curve is a two-dimensional quadratic function, a two-dimensional sub-pixel positional difference ($\delta x$, $\delta y$) can be assumed to satisfy:

$$a\delta x^2 + b\delta y^2 + c\delta x\delta y + d\delta x + e\delta y + f = SSD \qquad (46)$$

For example, by giving actually measured values of block errors for nine points of −1 to +1 as $\delta x$ and $\delta y$, and calculating a least square solution of coefficients a to f, or by giving appropriate six points, and calculating a solution of coefficients a to f, ($\delta x$, $\delta y$) can be estimated by solving two equations obtained by a partial differential=0. Also, as described in Shimizu & Okutomi, "Two-Dimensional Simultaneous Sub-Pixel Estimation for Area-Based Matching" (The IEICE Transactions D-II, Vol. J87-D-II, No. 2, pp. 554-564, 2004), a method of simultaneously estimating two-dimensional differences using a one-dimensional sub-pixel positional difference formula may be used. For example, corner detection may be made using, for example, a Harris corner detector (C. Harris, M. Stephens, A Combined Corner and Edge Detector, Alvey Vision Conference, pp. 147-151, 1988), a two-dimensional sub-pixel positional difference formula may be used for a corner part, and a one-dimensional sub-pixel positional difference formula may be used for other parts. Note that the ideal corresponding points can be corrected by adding or subtracting the magnitudes of estimated phase shifts to or from the ideal corresponding points.

(Step 6) The calculation unit 1005 sets pixel values at the centers of estimated blocks as those at the ideal corresponding points (step S1108). Alternatively, if step 5 is skipped, after the phase shifts are estimated, pixel values at the ideal corresponding points may be generated by interpolation according to the estimated phase shifts.

(Step 7) A formula which includes a Point Spread Function at each ideal corresponding point expressed by:

$$w_{ij} \qquad (47)$$

and a found pixel value:

$$y_i \qquad (48)$$

is added. Note that steps 3 to 7 are basically executed for all of the ideal corresponding points set in step 2. For example, in the case of implementation as a single-thread program, steps 3 to 7 are repetitively executed while switching the ideal corresponding points. In the case of implementation as a multi-thread program or parallelized hardware, for example, it is designed to divide a screen into some areas, and to simultaneously execute steps 3 to 7 for respective areas. However, when the processing time is limited, as in a use method in which resolution conversion is applied to broadcasting video data at the same speed as the frame rate of an input moving image, and that result is output to a television or monitor in real time, a method of setting an abort time in advance, and allowing the control to advance to step 8 if not all ideal corresponding points are processed when the abort time is reached may be adopted. The ideal corresponding points which are not processed are discarded.

(Step 8) The calculation unit 1005 applies the RECONSTRUCTION to obtained W and y (step S1108).

When steps 1 to 8 are executed for each of moving image frames as target image data, the resolution conversion can be applied to the entire moving image by repeating respective steps while switching an input image to the next frame until all the frames are processed.

(Various Ideal corresponding Point Density Functions)

The ideal corresponding point density function controls the tradeoff between the output image quality and an amount of computation of this embodiment. In order to effectively use this embodiment, the output image quality is likely to lower with a decrease in the number of ideal corresponding points. However, only the amount of computation is to be reduced without lowering the output image quality as much as possible. For this purpose, it is important how to apply the ideal corresponding point density function.

As a method of applying the ideal corresponding point density function, a method of calculating a Saliency Map (L. Itti et al., A Model of Saliency-Based Visual Attention for Rapid Scene Analysis, IEEE Trans. Pattern Analysis and Machine Intelligence, vol. 20, no. 11, Nov. 1998.), and increasing the density for an important part may be used. Of course, the Saliency Map may be used intact. However, calculations of the Saliency Map require a considerable amount of computation, and simpler calculation methods will be examined.

One method is to determine the ideal corresponding point density function in advance. The method of this type has an advantage of calculating coefficients required for interpolation and generation of blocks with reference to ideal corresponding points in advance. As an example of the method of this type, a method of using a function which sets a high density at the center of the screen, and lowers the density the further the position is away from that position, is available. More specifically, for example, a function value is given by a two-dimensional Gaussian function:

$$G_2(x,y) = \exp\{-((\Delta x)^2 + (\Delta y)^2)/2\sigma^2\} \tag{49}$$

For example, if an apparatus for detecting the visual axis position is available, the position where the high density is set need not be the center of the screen and a position of interest determined by the visual axis may be set as a reference position.

Meanwhile, in a local region where pixel values are uniform, an image quality difference is small even when no ideal corresponding points are set. Hence, a flat region in input target image data is calculated, and the density of the ideal corresponding points may be set to be zero (or upon execution of continuous value control to be described later, the density may be set to be a relatively small value). As a method of calculating a flat region, for example, a method of calculating the edge magnitudes between neighboring pixels of input target image data, and determining, as a flat region, a region where the edge magnitudes are equal to or smaller than a threshold can be used. Alternatively, a method of allocating a separately defined block to have each of pixels of input target image data as the center, and determining, as a flat region, a region where a value (for example, variance) which represents fluctuation in that block does not exceed a predetermined range, can also be used.

(Continuous Control of Function Value Using Edge Magnitude)

If coefficients required for interpolation and generation of blocks with reference to ideal corresponding points need not be calculated in advance, a method of checking characteristics of an image, and controlling the ideal corresponding point density function according to the characteristics may be used as another method. As an example of such method, a method of estimating the intensity of a high-frequency component between neighboring pixels of input target image data, and changing a function value according to that intensity is available. The reason for this is as follows. Estimation of a function value is designed to reveal the effect of resolution conversion at an ideal corresponding point. On the other hand, as is known, as high-frequency components remaining in pixel values of the input resolution are higher, the effect of resolution conversion becomes higher. Hence, the density function value is determined under the assumption that as high-frequency components of respective pixels of the input resolution in the vicinity of each ideal corresponding point are stronger, the effect of resolution conversion is also higher. More specifically, the calculation unit 1005 determines a function value in, e.g., the following sequence.

(Step X1) A filter that attenuates low-frequency components for extracting high-frequency components is applied to input image data to generate high-frequency component data, and the intensities of the high-frequency components are estimated. As a filter having such characteristics, for example, a differential filter, Sobel filter, Laplacian filer, and an edge detection method such as a Canny edge detection method are known. In the case of a filter having directionality such as a Sobel filter, high-frequency components are obtained in the horizontal and vertical directions, respectively. If an obtained value is negative, its absolute value is used as high-frequency component data. The high-frequency component data to be obtained indicates the intensity of a high-frequency component of each pixel in an isotropic case or that at the central position between pixels in an anisotropic case.

(Step X2) An estimated value of the high-frequency component is calculated for each point where a density value is to be calculated. For example, one of steps X2-A and X2-B below is executed.

(Step X2-A) A rectangle or circle which includes a point where the density value is to be calculated as the center and has a predetermined size (when the number of dimensions N of an image is three or more, a (hyper) cube or (hyper) sphere) is assumed, and an estimated value of the high-frequency component is calculated using high-frequency component data within that range. As the estimated value, for example, an average value, a variance, a value obtained by adding an integer multiple of a standard deviation to an average value, a median, a maximum value, and a minimum value can be used.

(Step X2-B) Since high-frequency component data are obtained at only discrete positions, an appropriate kernel function (e.g., a Gaussian function, Rectangular Window Function, or Hanning Window function) having each pixel as the center is assumed, and a total value of the high-frequency component data for a point where the density value is to be calculated is calculated as an estimation value of the high-frequency component.

(Step X3) Function values are calculated based on the estimated values of the high-frequency components. For example, letting s ($\geq 0$) be the estimated value of a high-frequency component, and k be a predetermined parameter, an equation:

$$f(s) = 2/\{1+\exp(-ks)\} - 1 \tag{50}$$

is used as the estimated value of a function value f(s). This function assumes zero when there is no high-frequency component, and assumes a larger value as the high-frequency component becomes stronger but never exceeds 1.

(Continuous Control of Function Value Using Fluctuation in Time Direction)

When a target image has two dimensions (horizontal and vertical) or three dimensions (horizontal, vertical, and depth), and resolution conversion is to be applied to its time-series images (i.e., when resolution conversion is applied to respective frames of a moving image), or when the target image includes a time axis (i.e., when resolution conversion is applied to a spatiotemporal image), the number of ideal corresponding points can be reduced using the visual characteristics in that the visual acuity lowers for a moving part having a harder movement. More specifically, the calculation unit 1005 calculates, for example, a function value as a function of an inter-frame difference in the following sequence.

(Step 1) This step is executed in place of step X1 above. The absolute values of differences (inter-frame differences) between pixel values of pixels on an image frame as a resolution conversion target (each image frame in case of a spatiotemporal image) and its neighboring image frame (assume that the neighboring frame is input as a part of search image pattern data) are calculated as high-frequency component data. Alternatively, a predetermined constant T is set in advance, and if the obtained difference value falls within a separately defined range, zero is set as high-frequency component data; otherwise, T is set as high-frequency component data. Alternatively, in consideration of the fact that human visual acuity can follow a slow movement, optical flows with a neighboring frame for respective pixels are calculated (using, e.g., a Lucas-Kanade method, Horn Schunck method, or block matching method), so as to calculate, as high-frequency component data, the absolute values of differences between pixel values of frames (such differences will also be referred to as inter-frame differences hereinafter for the sake of convenience) in consideration of a motion. At this time, in order not to follow too large a motion, for example, multi-scale processing may be skipped (or the number of layers may be reduced) in the case of the Lucas-Kanade method or Horn Schunck method, or a search range is limited to a small range in case of the block matching method. Also, in consideration of the fact that the visual acuity for a moving state is lower than a still state, the obtained motion may be multiplied by a separately defined constant, and the product may be added to the high-frequency component data value calculated based on the inter-frame difference.

(Step 2) Using the obtained high-frequency component data as inputs, (step X2) and (step X3) described above are executed.

(Allocation Method of Ideal Corresponding Points Based on Density Function Values)

Using one of the aforementioned methods or their combination, when points on the N-dimensional space are given, ideal corresponding point density function values are obtained, and can be used as inputs upon allocating ideal corresponding points (step S1103). When two or more function value calculation methods are combined, for example, (step X3) may be executed based on, e.g., the weighted sum of the high-frequency component data, or the function values may be calculated by the respective methods, and their representative values (for example, products or sums, average values, medians, maximum values, or minimum values) may be selected as final function values. After that, using these ideal corresponding point density function values, ideal corresponding points can be allocated (step S1104). More specifically, an ideal corresponding point may be allocated at each position where an integral value of the ideal corresponding point density function values becomes 1. When the shape of the function does not change for each process, the positions of ideal corresponding points are calculated in advance, and the ideal corresponding points need only be allocated at these positions. However, when the shape of the function changes for each process, an amount of computation increases if precise integral values are calculated.

Figure 20:
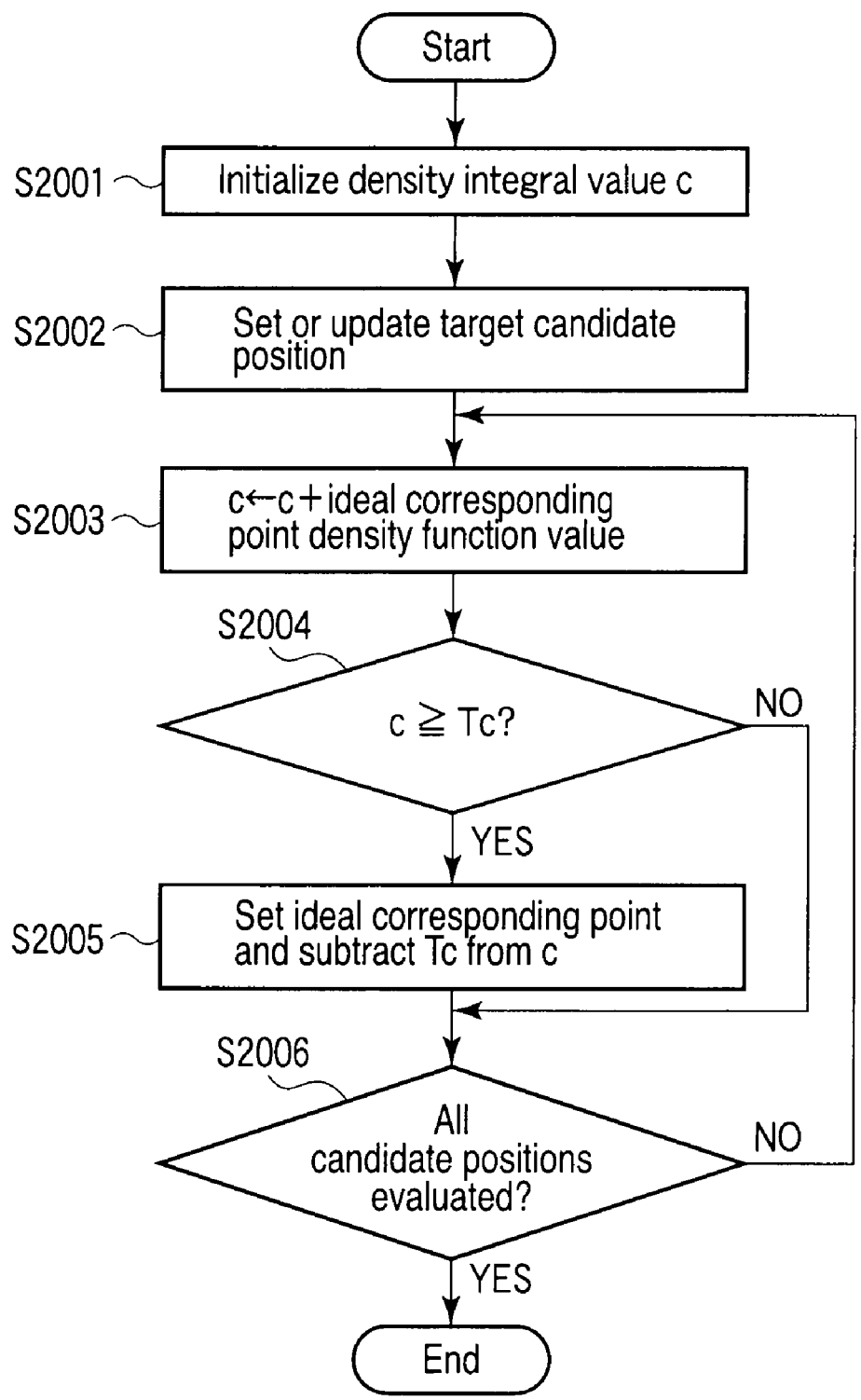
FIG. 20 is a flowchart showing an example of the operation executed when the resolution conversion apparatus according to the embodiment allocates ideal corresponding points in accordance with an ideal corresponding point density function.

As a method of allocating ideal corresponding points according to the ideal corresponding point density function with a smaller amount of computation, for example, when a function that outputs a value ranging from 0 to 1 is used as the ideal corresponding point density function, allocation candidate positions of ideal corresponding points are determined in advance, an integral value of the function is sequentially calculated while discretely scanning an image, and an ideal corresponding point is assigned every time the integral value exceeds a threshold, thus determining the positions of the ideal corresponding points. More specifically, for example, ideal corresponding points are allocated while scanning a set of allocation candidate points of ideal corresponding points (ideal corresponding point candidate positions) in a predetermined order (e.g., a raster-scan order or time-axis order). The set of ideal corresponding point candidate positions includes, for example, respective pixels of the output resolution. FIG. 20 is a flowchart showing this processing. A practical sequence is as follows. The calculation unit 1005 executes this operation.

(Step 1) A density integral value c is initialized by an appropriate value (for example, 0 or a value obtained by multiplying a threshold Tc to be described later by 0.5) (step S2001).

(Step 2) A head position in the raster-scan order is selected as an ideal corresponding point candidate position of interest (the target candidate position) (step S2002).

(Step 3) An ideal corresponding point density function value at the target candidate position is calculated, and that value is added to the density integral value c. Note that a maximum value (for example, a value 1.5 times of the threshold Tc to be described later) may be set for the density integral value c, and when the density integral value c after addition is too large, the density integral value c may be set as a maximum value (an operation for suppressing the density integral value c to be a maximum value or less need not be executed) (step S2003).

(Step 4) The density integral value c is compared with the threshold Tc (step S2004). If the density integral value c exceeds the threshold Tc (for example, when the set of ideal corresponding point candidate positions includes respective pixels of the output resolution, Tc=0.95), an ideal corresponding point is allocated at the target candidate position, and Tc is subtracted from the density integral value c (step S2005). Otherwise, no ideal corresponding point is allocated at the target candidate position.

(Step 5) If all ideal corresponding point candidate positions have been processed, the processing ends (step S2006). Otherwise, the target candidate position is shifted to the next position in the raster-scan order (step S2002), and the process then returns to step 3.

Note that if an integral value is to be calculated as it is defined, the density integral value c is multiplied by a value obtained by multiplying a function value by an integral period in step 3. However, if Tc is multiplied by a reciprocal value of a value to be multiplied as the integral period, no multiplication is required in step 3.

When the shape of the function does not change for each process, the positions of the ideal corresponding points can also be determined by the aforementioned method. In this case, in order to precisely calculate the set of ideal corresponding point candidate positions, values denser than original values may be used (for example, a resolution four times the output resolution is assumed for respective axes, and pixel positions of that resolution may be used).

As a result of such allocation, the densities of ideal corresponding points can be dynamically controlled, and wasteful calculations can be eliminated without impairing the subjective image quality.

(Control of Prior Knowledge Based on Density Function Value)

The calculated density function values represent the allocation densities of ideal corresponding points. In a region with the low density function value, the density of ideal corresponding points is low. In this region, the amount of computation can be reduced, but the estimation precision of the image x drops. A method of compensating for the estimation precision drop of the image x by prior knowledge using the MAP estimation shown in FIG. 2 described above will be described below. In the resolution conversion based on the MAP method, the priori knowledge that represents characteristics of an image normally describes relationships of pixel values, which are expected to be established between several neighboring pixels (for example, a plurality of neighboring pixels), and that knowledge is incorporated in the energy function to be minimized. For example, in the aforementioned energy function given by:

$$E = \|y - Wx\|_1 + \sum_m \lambda_m \|x - P_m x\|_1 \qquad (51)$$

the magnitude of a difference value between two pixels is expected to be small, and the weight ($\lambda_m$) of the second term represents a penalty term for that magnitude. The second term corresponds to the priori knowledge that pixel values of neighboring pixels are normally similar to each other, and acts to erase a high-frequency component. The weight of the second term is normally uniform for all high-resolution pixels. However, in a region with the low density function value, since it is not expected to reconstruct high-frequency components, that weight can be controlled according to the density function value. More specifically, an equation:

$$E = \|y - Wx\|_1 + \sum_m \lambda_m \|C_m(x - P_m x)\|_1 \qquad (52)$$

which introduces weights to respective pixels of the second term using, for example, a diagonal matrix $C_m$ is used as a target to be minimized, and the weight values as diagonal elements of $C_m$ can be set to be lower the higher the density function value between two pixels whose difference value is calculated is and to be higher the lower the density function value is. More specifically, this weight uses a value obtained by, for example, calculating a total of the density function values of two pixels (or a value of predetermined one of the two pixels, or a maximum or minimum value of the density function values of two pixels), and subtracting that value from a separately defined weight control parameter (for example, a value ranging from about 2 to 3 if the density function value assumes a value ranging from 0 to 1). In this way, the estimation precision drop of the image x due to a lower density of ideal corresponding points can be compensated for by the priori knowledge without increasing the amount of computation so much.

As described above, when this embodiment is used, the two problems, i.e., a problem that since the densities of corresponding points found on the conversion target frame differ according to location, the reconstruction performance of an output image is not stable, and a problem that since corresponding points found on the conversion target frame readily include those with low reliability, strong noise tends to be generated, can be solved while suppressing an increase in an amount of computation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A resolution conversion apparatus for N-dimensional images (N: a natural number) comprising:
a first input unit configured to input target image data which is a set of first coordinate values and first pixel values at the first coordinate values;
a second input unit configured to input search image pattern data which is a set of second coordinate values and second pixel values at the second coordinate values;
a third input unit configured to input an ideal corresponding point density function which uses N-dimensional coordinate values and calculates density values of ideal corresponding points;
an allocating unit configured to allocate on the N-dimensional space a set of the ideal corresponding points according to the density values;
a first acquisition unit configured to acquire, from the target image data, an input image pattern including pixel values within a predetermined range with reference to each of the ideal corresponding points;
a second acquisition unit configured to acquire, as a plurality of candidate image patterns, from the search image pattern data, a first candidate image pattern including pixel values within the predetermined range, which corresponding to the predetermined range used in the first acquisition unit, with reference to each of the second coordinate values;
a finding unit configured to find, from the search image pattern data, an estimated image pattern as a second candidate image pattern of the candidate image patterns which has a smaller difference from the input image pattern than other candidate image patterns;
a first setting unit configured to set pixel values of positions corresponding to the ideal corresponding points in the estimated image pattern as pixel values at the ideal corresponding points; and
a conversion unit configured to convert a resolution of the target image data using the N-dimensional coordinate values and the pixel values corresponding to the N-dimensional coordinate values.

2. The apparatus according to claim 1, wherein the third input unit inputs, as the ideal corresponding point density function, a function which assumes a larger function value at a central coordinate in the N-dimensional coordinate values and decreases the function value as a position is farther away from the central coordinate.

3. The apparatus according to claim 1, further comprising:
a detection unit configured to detect a flat region in a target image corresponding to the target image data, and
wherein the third input unit inputs, as the ideal corresponding point density function, a function which assumes a relatively smaller function value in the detected flat region than other regions.

4. The apparatus according to claim 1, further comprising:
a calculation unit configured to calculate inter-frame differences between the target image data and the search image pattern data, and
wherein the third input unit sets the ideal corresponding point density function as a function of magnitudes of the inter-frame differences.

5. The apparatus according to claim 1, wherein the allocating unit includes:
a forth input unit configured to input a set of ideal corresponding point candidate positions as candidates of positions where ideal corresponding points are to be set;
a second setting unit configured to set each of elements of the set of the ideal corresponding point candidate positions as a target candidate position;
a storage unit configured to store an integral value;
a third acquisition unit configured to acquire a summed integral value by adding the value of the ideal corresponding point density function at the target candidate position to the integral value; and
a third setting unit configured to set, when the summed integral value exceeds a threshold, an ideal corresponding point at the target candidate position, and to subtract the threshold from the summed integral value.

6. The apparatus according to claim 1, wherein the conversion unit includes:
   a storage unit configured to store a priori knowledge that makes a relationship between pixel values of neighboring pixels of an output resolution approach a predetermined relationship;
   a calculation unit configured to calculate a density function value at least one of the pixels that describe the relationship using the ideal corresponding point density function; and
   a control unit configured to control a weight of the priori knowledge to be smaller as the density function value is larger.

7. A resolution conversion method for N-dimensional images (N: a natural number) comprising:
   inputting target image data which is a set of first coordinate values and first pixel values at the first coordinate values;
   inputting search image pattern data which is a set of second coordinate values and second pixel values at the second coordinate values;
   inputting an ideal corresponding point density function which uses N-dimensional coordinate values and calculating density values of ideal corresponding points;
   allocating on the N-dimensional space, a set of the ideal corresponding points according to the density values;
   acquiring, from the target image data, an input image pattern including pixel values within a predetermined range with reference to each of the ideal corresponding points;
   acquiring, as a plurality of candidate image patterns, from the search image pattern data, a first candidate image pattern including pixel values within the predetermined range, which corresponding to the predetermined range, with reference to each of the second coordinate values;
   finding, from the search image pattern data, an estimated image pattern as a second candidate image pattern of the candidate image patterns which has a smaller difference from the input image pattern than other candidate image patterns;
   setting pixel values of positions corresponding to the ideal corresponding points in the estimated image pattern as pixel values at the ideal corresponding points; and
   converting a resolution of the target image data using the N-dimensional coordinate values and the pixel values corresponding to the N-dimensional coordinate values.

8. A computer readable medium including computer executable instructions, wherein the instructions, when executed by a processor, cause the processor to perform a method for N-dimensional images (N: a natural number) comprising:
   inputting search image pattern data which is a set of second coordinate values and second pixel values at the second coordinate values;
   inputting an ideal corresponding point density function which uses N-dimensional coordinate values and calculating density values of ideal corresponding points;
   allocating on the N-dimensional space, a set of the ideal corresponding points according to the density values;
   acquiring, from the target image data, an input image pattern including pixel values within a predetermined range with reference to each of the ideal corresponding points;
   acquiring, as a plurality of candidate image patterns, from the search image pattern data, a first candidate image pattern including pixel values within the predetermined range, which corresponding to the predetermined range, with reference to each of the second coordinate values;
   finding, from the search image pattern data, an estimated image pattern as a second candidate image pattern of the candidate image patterns which has a smaller difference from the input image pattern than other candidate image patterns;
   setting pixel values of positions corresponding to the ideal corresponding points in the estimated image pattern as pixel values at the ideal corresponding points; and
   converting a resolution of the target image data using the N-dimensional coordinate values and the pixel values corresponding to the N-dimensional coordinate values.

* * * * *